(12) United States Patent
Naito et al.

(10) Patent No.: US 9,305,710 B2
(45) Date of Patent: Apr. 5, 2016

(54) METHOD FOR MANUFACTURING TUNGSTEN CAPACITOR ELEMENT

(71) Applicant: SHOWA DENKO K.K., Tokyo (JP)

(72) Inventors: Kazumi Naito, Tokyo (JP); Shoji Yabe, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/744,189

(22) Filed: Jun. 19, 2015

(65) Prior Publication Data
US 2015/0371784 A1 Dec. 24, 2015

(30) Foreign Application Priority Data

Jun. 23, 2014 (JP) ................................. 2014-128078

(51) Int. Cl.
H01G 9/00 (2006.01)
H01G 4/06 (2006.01)
H01G 5/013 (2006.01)
B23H 3/04 (2006.01)
C23C 28/00 (2006.01)
H01G 9/042 (2006.01)
H01G 9/052 (2006.01)

(52) U.S. Cl.
CPC ............. *H01G 9/0036* (2013.01); *H01G 9/042* (2013.01); *H01G 9/0525* (2013.01); *Y10T 29/42* (2015.01)

(58) Field of Classification Search
CPC ............. H01G 9/15; H01G 9/36; H01G 9/42; H01G 9/52; H01G 9/525
USPC .................. 361/271–330, 500–541; 29/25.03; 252/515; 427/79, 80; 438/386–399; 75/228–254
See application file for complete search history.

(56) References Cited

U.S. PATENT DOCUMENTS

2008/0019080 A1* 1/2008 Naito ..................... C25D 11/06
361/523
2013/0277626 A1 10/2013 Naito

FOREIGN PATENT DOCUMENTS

WO 2012/086272 A1 6/2012

* cited by examiner

*Primary Examiner* — Karen Kusumakar
(74) *Attorney, Agent, or Firm* — Sughrue Mion, PLLC

(57) ABSTRACT

A method for manufacturing a tungsten capacitor element, which includes: a sintering process for forming an anode body by sintering a tungsten powder or a molded body thereof, a chemical conversion process for forming a dielectric layer on the surface layer of the anode body, a process for forming a semiconductor layer on the dielectric layer, a post-chemical conversion process for repairing the defects generated on the dielectric layer, a non-aqueous electrolysis process for conducting electrolysis operation by immersing the anode body in a solution of a non-aqueous solvent containing an oxidizing agent, and a process of forming a conductor layer on the anode body, in this order.

5 Claims, No Drawings

METHOD FOR MANUFACTURING TUNGSTEN CAPACITOR ELEMENT

TECHNICAL FIELD

The present invention relates to a method for manufacturing a tungsten capacitor element. Specifically, the present invention relates to a method for manufacturing a high heat-resistance tungsten capacitor element, and more specifically, a tungsten capacitor element in which leakage current (LC) does not increase after subjecting the capacitor element to heat treatment at a high temperature, for example, in a sealing process and in the treatment in a reflow furnace.

BACKGROUND ART

With the progress of small-size, high-speed and light-weight electronic devices such as cellular phones and personal computers, the capacitor used for these electronic devices is demanded to be smaller in size and lighter in weight and to have a larger capacitance and a lower equivalent series resistance (ESR).

As an example of such a capacitor, an electrolytic capacitor has been proposed, which capacitor is produced by anodically oxidizing a sintered body (anode body) obtained by sintering valve-acting metal powder such as tantalum which can be anodized to form a dielectric layer made of the oxide of the metal on the surface of the sintered body.

The electrolytic capacitor using tungsten as a valve-acting metal and employing a sintered body of the tungsten powder as an anode body can attain a larger capacitance compared to the electrolytic capacitor obtained with the same formation voltage by employing an anode body of the same volume using the tantalum powder having the same particle diameter.

The present inventors proposed a tungsten powder comprising tungsten silicide in the particle surface region and having a silicon content of 0.05 to 7 mass %; an anode body comprising the sintered body of the tungsten powder; an electrolytic capacitor; and a production method thereof (Patent Document 1; WO 2012/086272; US 2013/277626 A1).

PRIOR ART

Patent Document

Patent Document 1: WO 2012/086272 (US 2013/277626 A1)

DISCLOSURE OF THE INVENTION

Problems to be Solved by the Invention

A tungsten capacitor element, which is obtained by forming a dielectric layer on the surface layer of an anode body obtained by sintering tungsten powder or a molded body thereof, and forming a semiconductor layer and a conductor layer in this order on a dielectric layer, is expected to be commercialized because the unit material cost of an anode body is low and the element has a large capacitance per volume. However, there are issues to contend with, including increase in LC after subjecting the capacitor element to heat treatment at a high temperature, for example, in a sealing process and in the treatment in a reflow furnace.

Accordingly, an object of the present invention is to provide a method for producing a high heat-resistance tungsten capacitor element.

Means to Solve the Problem

The present inventors have made study to determine the cause of increase in LC after the high-temperature heat treatment of a tungsten capacitor element. As a result, the following two causes have been identified.

1. Detachment of a Semiconductor Layer in the Post-Chemical Formation Process

In the post-chemical formation process to repair defects generated on the dielectric layer, a part of the semiconductor layer is detached due to the ion migration and a thinned-out portion appears in the semiconductor layer. Along with this change, it is assumed that the thermal stress to the dielectric layer increases at the time of a high-temperature heat treatment, which results in the increase in leakage current.

Furthermore, the dielectric layer of a tungsten capacitor element is more susceptible to the reduction action and solvent action compared to that of a tantalum or niobium capacitor element due to the hydrogen and water as being a by-product at the time of forming a semiconductor layer. Accordingly, a post-chemical formation under more strict conditions is required and it is assumed that the detachment of the semiconductor layer is likely to occur and is susceptible to the increase in leakage current.

2. Residual of Unreacted Monomer and Low-Polymerization Oligomer in the Semiconductor Layer After the process of forming a semiconductor layer, an unreacted polymer and a low-polymerization oligomer form a CT complex with a conductive polymer which constitutes the semiconductor layer, and attach to and remain in the semiconductor layer. Some of the residuals cannot be removed by the washing with a solvent. Accordingly, heat polymerization of the residual occurs when a capacitor element is subjected to a high-temperature heat treatment, and hydrogen and water (in a state of steam at a high temperature) are generated. The present inventors have thought that this causes the degradation of the dielectric layer and increase in leakage current.

As mentioned above, the dielectric layer of a tungsten capacitor element is susceptible to the action of hydrogen and water. Therefore, it is assumed that the dielectric layer is more likely to be affected by this factor.

The present inventors have found that the above two factors can be eliminated by providing a non-aqueous electrolysis process of immersing the anode body after the post-chemical formation process in a solution of non-aqueous solvent containing an oxidizing agent and subjecting it to electrolysis, and have accomplished the present invention. As a technology which is somewhat related to the present invention, there is a patent document (JP 2006-108658 A; US 2008/019080 A1) disclosing a post-chemical formation operation using an aqueous solvent containing an oxidizing agent. However, the polymerization reaction of the conductive polymer does not proceed in an aqueous solvent, and the above two factors (problems) cannot be eliminated by the post-chemical formation operation of the document.

That is, the present invention relates to a production method of a capacitor element in the following [1] to [3].

[1] A method for producing a capacitor element, comprising:
a sintering process to form an anode body by sintering tungsten powder or a molded body thereof,
a chemical formation process to form a dielectric layer on the surface layer of the anode body,
a process of forming a semiconductor layer to form a semiconductor layer on the dielectric layer,
a post-chemical formation process to repair defects generated on the dielectric layer, a non-aqueous electrolysis process to conduct an electrolysis operation by immersing the anode body in a non-aqueous solvent containing an oxidizing agent, and a process of forming a conductor layer to form a conductor layer on the anode body, in this order.

[2] The method for producing a capacitor element as described in [1] above, wherein the oxidizing agent in the non-aqueous electrolysis process is at least one member selected from a group consisting of sulfonic acid, salt of sulfonic acid and organic peroxide.

[3] The method for producing a capacitor element as described in [2] above, wherein the oxidizing agent in the non-aqueous electrolysis process is naphthalenesulfonic acid or naphthalene sulfonate.

[4] The method for producing a capacitor element as described in [1] above, wherein the non-aqueous solvent in the non-aqueous electrolysis process is at least one member selected from a group consisting of methyl alcohol, ethanol, propyl alcohol, ethylene glycol and propylene glycol.

[5] The method for producing a capacitor element as described in [4] above, wherein the non-aqueous solvent in the non-aqueous electrolysis process is a mixed solvent of monovalent alcohol selected from a group consisting of methyl alcohol, ethanol, and propyl alcohol, and bivalent alcohol selected from a group consisting of ethylene glycol and propylene glycol.

Effect of the Invention

The method of the present invention enables the production of a high heat-resistance tungsten capacitor element, and particularly, a tungsten capacitor element in which leakage current (LC) does not increase after subjecting the capacitor element to heat treatment at a high temperature, for example, in a sealing process and in the treatment in a reflow furnace.

MODE FOR CARRYING OUT THE INVENTION

A commercially available tungsten powder can be used as a tungsten powder serving as a material of the anode body.

A particle diameter of a commercially available tungsten powder is generally 0.5 µm or more, and tungsten powder having a smaller particle diameter can be obtained, for example, by reducing tungsten trioxide powder under hydrogen atmosphere. The reduced tungsten powder may be pulverized using a pulverizing media. As the pulverizing media, using the pulverizing media made of the metal carbide such as tungsten carbide and titanium carbide is preferable. In the case of using these metal carbides, fine fragments of the pulverizing media is less likely to be mixed into the powder. Preferred is a pulverizing media made of tungsten carbide.

The tungsten powder having a smaller particle diameter can also be obtained by a method of reducing tungstic acid or tungsten halide with a reducing agent such as hydrogen and sodium, and appropriately selecting the reducing conditions; or by a method of reducing the tungsten-containing mineral directly or through several steps and by selecting the reducing conditions.

The volume average particle diameter of the tungsten powder, D50 (a particle diameter when the accumulated volume % corresponds to 50 volume % in the volume basis particle diameter cumulative distribution), is preferably 0.1 to 0.6 µm, more preferably 0.1 to 0.5 µm, and still more preferably 0.1 to 0.4 µm. The volume average particle diameter D50 can be determined by measuring the volume basis particle diameter distribution using a commercially available product.

As a tungsten powder, either of ungranulated tungsten powder (hereinafter may be referred to as "primary powder") or granulated tungsten powder (hereinafter may be referred to as "granulated powder") may be used. The granulated powder is preferable from the viewpoint of ease in forming fine pores in the anode body. Also, using a primary power, the fine pore distribution may be adjusted as JP-A-2003-213302 (U.S. Pat. No. 6,934,146 B2) discloses.

In the method for producing a tungsten capacitor element of the present invention, at least one member selected from tungsten silicide, tungsten containing nitrogen solid solution, tungsten carbide and tungsten boride can be used as a tungsten powder. Accordingly, the "tungsten powder" described in the scope of claim and specification of the present invention may contain at least one member selected from tungsten silicide, tungsten containing nitrogen solid solution, tungsten carbide and tungsten boride.

Furthermore, the tungsten powder of the present invention may contain phosphorus and oxygen elements in an amount to be described later.

In "tungsten silicide" of the present invention, all of the tungsten is not necessarily silicified. For example, tungsten silicide may exist only in the surface region of the particles.

As a tungsten powder, tungsten powder disclosed by Patent Document 1, in which only the surface region of the particles is silicified to be tungsten silicide so as to control the silicon content to a specific range, can be suitably used.

Tungsten powder in which the surface region of the particles are silicified can be obtained by, for example, mixing the silicon powder well into the tungsten powder and allowing the mixture to react by heating under reduced pressure. In the case of using this method, the silicon powder reacts with the tungsten from the surface of the tungsten particles and tungsten silicide such as $W_5Si_3$ is formed and localized generally within 50 nm from the surface layer of the tungsten particles. Hence, the core of the primary particles remains as a highly-conducting metal, which suppresses the equal serial resistance of the anode body for a capacitor produced using the tungsten powder, which is preferable.

The tungsten silicide content can be adjusted by the silicon amount to be added. When the tungsten silicide content is expressed by the silicon content regardless of the kind of a tungsten silicide compound, the silicon content of the tungsten powder as whole is preferably 0.05 to 7.0 mass %, more preferably 0.20 to 4.0 mass %. The tungsten powder containing silicon within the above-mentioned range can impart good LC characteristics to the capacitors and can form a good dielectric layer without affecting the subsequent chemical formation process because the silicified portion is not too large in the tungsten powder.

The low-pressure condition at the time of silicifying the tungsten powder is preferably $10^{-1}$ Pa or lower, more preferably $10^{-3}$ Pa or lower. When the silicification is carried out at a pressure within the above-mentioned range, the oxygen content of the tungsten powder can be configured to a preferable range of 0.05 to 8 mass %.

The reaction temperature is preferably 1,100° C. or higher and 2,600° C. or lower. When a reaction temperature is set within the above range, the silicification does not take too long a time, and decrease the possibility of causing a problem such that silicon comes to evaporate and is alloyed with the electrode to thereby make the electrode be fragile. The smaller the particle diameter of the silicon to be used, the silicification can be carried out at a lower temperature.

As an example of the method for incorporating nitrogen solid solution in the surface region of tungsten powder, there is a method of placing the tungsten powder at 350 to 1,500° C.

under reduced pressure of a nitrogen gas atmosphere for from several minutes to several hours.

In case of incorporating nitrogen solid solution in the silicified tungsten powder, the method may be carried out at the time of heating to silicify the tungsten powder, or the treatment of incorporating nitrogen solid solution may be conducted before the silicification.

The treatment of incorporating the nitrogen solid solution may be performed at any stage of the primary powder, after producing the granulated powder, or after sintering the powder. Thus, the timing of the treatment is not specified but it is preferable to control the nitrogen content in the whole tungsten powder to 0.01 to 1.0 mass % in an early stage of the production process. This can prevent excessive oxidation of the powder when the powder is handled in air in the treatment of incorporating the nitrogen solid solution.

As an example of the method for carbonizing a part of the surface of the tungsten powder, there is a method of placing the tungsten powder at 300 to 1,500° C. under reduced pressure in a high temperature vacuum furnace using carbon electrodes for from several minutes to several hours. It is preferable to perform the carbonization so as to make the carbon content in the whole tungsten powder to 0.001 to 0.50 mass % by selecting the temperature and period of time. As to when the carbonization is performed during the production process, it is not specified like the treatment of incorporating nitrogen solid solution.

When the silicified tungsten powder is kept in a furnace provided with carbon electrodes in which nitrogen gas is introduced under predetermined conditions, the carbonization and the nitridation occur simultaneously, which enables production of the tungsten powder in which the surface region of the particles is silicified and carbonized, and a nitrogen solid solution is incorporated.

As an example of the method for boronizing a part of the surface of the tungsten powder, there is a method of mixing boron or a boron-containing compound as a boron source with the tungsten powder in advance and granulating the mixture. It is preferable to adjust the boron content in the whole tungsten powder to 0.001 to 0.10 mass %. Good LC characteristics can be attained when the boron content is within the above-mentioned range.

As to when the boronizing is performed during the production process, it is not specified like the treatment of incorporating nitrogen solid solution. When a tungsten powder in which the surface region of the particles is silicified and contains nitrogen solid solution is put into a furnace with carbon electrodes, mixed with a boron source and granulated, it is possible to manufacture a tungsten powder in which the surface region of the particles is silicified, carbonized and boronized, and contains nitrogen solid solution. When the boronizing is performed to obtain a predetermined boron content, the LC characteristics are further improved in some cases.

It is also possible to subject the tungsten powder to at least one of incorporation of nitrogen solid solution, carbonization, and boronization in advance, and to silicify the surface region of the tungsten powder. Or tungsten powder in which a surface region of the particles is silicified may be subjected to at least one of incorporation of nitrogen solid solution, carbonization, and boronization. Each element of silicon, nitrogen, carbon and boron is preferably blended in an amount so that the each content satisfies the above-mentioned range.

The oxygen content in the whole tungsten powder of the present invention is preferably 0.05 to 8.0 mass %, more preferably 0.08 to 1.0 mass %.

As a method for controlling the oxygen content to 0.05 to 8.0 mass %, the surface region of a tungsten powder is oxidized, in which powder the surface region of the particles is silicified, or in which powder at least one of incorporation of nitrogen solid solution, carbonization and boronization is furthermore conducted in the surface region of the particles. Specifically, nitrogen gas containing oxygen gas is introduced when the powder is taken out from a high temperature vacuum furnace at the time of producing a primary powder or a granulated powder of each tungsten powder. When the temperature at the time of being taken out from the high temperature vacuum furnace is lower than 280° C., the oxidization takes priority over the incorporation of nitrogen solid solution. By feeding the gas gradually, a predetermined oxygen element content can be obtained. By making each of the tungsten powders have a predetermined oxygen content in advance, it is possible to reduce the deterioration due to the excessive oxidation due to the formation of a natural oxide film having an uneven thickness during the subsequent processes for producing anode bodies for electrolytic capacitors using the powder. In cases where the oxygen content is within the above-mentioned range, the LC characteristics of the produced electrolytic capacitors can be kept better. In the case when nitrogen solid solution is not introduced in this process, an inert gas such as argon and helium may be used instead of the nitrogen gas.

The phosphorus element content of the whole tungsten powder of the present invention is preferably from 0.0001 to 0.050 mass %.

As an example of the methods for incorporating the phosphorus element in an amount of from 0.0001 to 0.050 mass % in the tungsten powder, in which the surface region of the particles is silicified, or in which at least one of incorporation of nitrogen solid solution, carbonization, boronization and oxidation is furthermore conducted in the surface region of the particles, there is a method of producing a powder containing phosphorus by placing phosphorous or a phosphorus compound as a phosphorus source in a high temperature vacuum furnace at the time of producing a primary powder or a granulated powder of each tungsten powder. It is preferable to incorporate phosphorus in the tungsten powder so as to make the phosphorus content within the above-mentioned range by controlling the amount of the phosphorus source and the like because the physical breakdown strength of the anode bodies produced thereof can be improved in some cases. When the phosphorus content falls within the range, LC characteristics of the manufactured electrolytic capacitor are further improved.

To attain better LC characteristics in the tungsten powder in which the surface region of particles is silicified, it is preferable to keep the total content of impurity elements other than each element of silicon, nitrogen, carbon, boron, oxygen and phosphorus in the powder to 0.1 mass % or less. In order to keep the content of these elements to the above-mentioned value or lower, the amount of the impurity elements contained in the raw materials, a pulverizing member to be used, containers and the like should be kept low.

It is preferable to subject the above-mentioned tungsten powder to molding treatment before sintering the powder to be made into a molded body. For example, a molded body may be produced by mixing resin for molding (such as acrylic resin) with the tungsten powder and using a molding machine. The tungsten powder to be molded may be either of a primary powder, a granulated powder, and a mixed powder of a primary powder and a granulated powder (a partially granulated powder). An average diameter of fine pores in the anode body to be described later becomes larger in case of using more granulated powder, while the average diameter becomes smaller in case of using more primary powder. The fine pore ratio of the anode body to be obtained can be adjusted by controlling the molding pressure.

<Sintering Process>

An anode body can be obtained by sintering a tungsten powder or a molded body thereof. By sintering, a porous body having fine pores between particles is formed, in which a specific surface area increases. The sintering is preferably performed under reduced pressure of $10^2$ Pa or less. The sintering temperature is preferably 1,000 to 2,000° C., more preferably 1,100 to 1,700° C., and still more preferably 1,200 to 1,600° C. The sintering time is preferably 10 to 50 minutes, more preferably 15 to 30 minutes.

<Chemical Formation Process>

After obtaining an anode body by sintering, a chemical formation process is conducted to form a dielectric layer on the surface layer of the anode body. The chemical formation conditions are given below.

As a chemical formation liquid to be used in the chemical formation process, a solution containing a conventional oxidizing agent can be used. The oxidizing agent used here is an oxygen-containing compound which is easily reduced. A preferred oxidizing agent is at least one member selected from a group consisting of a manganese(VII) compound, chromium (VI) compound, halogen acid compound, persulfuric acid compound and organic peroxide. Specific examples include a manganese(VII) compound such as permanganate; a chromium(VI) compound such as chromium trioxide, chromate and dichromate; a halogen acid compound such as perchloric acid, chlorous acid, hypochlorous acid and salts thereof; an organic peroxide such as peracetic acid, perbenzoic acid, and salts and derivatives thereof; and a persulfric acid compound such as persulfuric acid and salts thereof. Among these, a persulfric acid compound such as ammonium persulfate, potassium persulfate and potassium hydrogen persulfate is preferable from the viewpoint of ease in handling, stability as an oxidizing agent, solubility in water, and capability of increasing a capacitance. These oxidizing agents may be used singly or in combination of two or more thereof.

The content of the oxidizing agent is preferably 0.05 to 12 mass %, more preferably 0.05 to 7 mass %, still more preferably 1 to 5 mass %, in the chemical conversion solution. In cases where the content of the oxidizing agent is within the above-mentioned range, a capacitor element not offering improvement in capacitance due to a too high content of the oxidizing agent is less likely to come out, and time for washing the conversion solution after the chemical conversion process can be saved.

The chemical conversion solution may comprise a known electrolyte within a scope which does not affect the performance of the capacitor element. Examples of the electrolyte include acid such as nitric acid, sulfuric acid, boric acid, oxalic acid, adipic acid and phosphoric acid; and alkali metal salts and ammonium salts thereof. When too much electrolyte is contained, it will generate protrusions and ridges on the surface of the dielectric layer and the smoothness of the dielectric layer may be impaired in some cases.

The chemical conversion process may be repeated several times.

Before or after the chemical conversion using a chemical conversion solution containing the above-mentioned oxidizing agent, chemical conversion using a chemical conversion solution containing the above-mentioned electrolyte may be conducted as needed. In a method of conducting chemical conversion using a chemical conversion solution containing an oxidizing agent as well as chemical conversion using a chemical conversion solution containing an electrolyte, both solutions may be mixed with each other, leading to the degradation of both solutions in some cases. But this can be prevented by conducting washing with water for a long time after the chemical formation process.

In the chemical conversion process, the anode body is immersed in the above-mentioned chemical conversion solution and voltage is applied thereto. Voltage is applied between the anode body (anode) and a counter electrode (cathode). An electric current can be passed to the anode body through an anode lead wire.

Applying voltage starts at a predetermined initial current density. The current density is maintained and after the voltage reaches a predetermined value (formation voltage), it is preferable to maintain the voltage value. The formation voltage can be appropriately configured depending on a desired withstand voltage.

The temperature of the chemical conversion treatment is preferably 62° C. or lower, more preferably 0 to 60° C., and still more preferably 5 to 50° C.

It is preferable to wash the anode body with pure water after the chemical conversion. The chemical conversion solution is to be removed as much as possible by washing. After washing with water, it is preferable to remove water which was adhered on the surface or permeated in fine pores of the anode body.

The washing water is removed by, for example, bringing water into contact with a solvent (such as propanol, ethanol and methanol) having miscibility with water and subjecting it to heat treatment. There is no particular limit on the heat treatment temperature and it is preferably 150 to 200° C. The heat treatment time is preferably from one to 60 minutes, more preferably from five to 30 minutes, and still more preferably from 10 to 20 minutes.

<Process of Forming a Semiconductor Layer>

After the chemical conversion process, a process of forming a semiconductor layer is conducted. In the process of forming a semiconductor layer, a conductive polymer is polymerized on the dielectric layer that was formed in the chemical conversion process.

A known conductive polymer which was conventionally applied to a capacitor can be used as a conductive polymer. For example, polypyrrole and polyethylene dioxythiophene can be used. Before, after or during the formation of a semiconductor layer comprising a conductive polymer, a layer comprising manganese dioxide or an island-shaped layer dotted with manganese dioxide may be formed.

The polymerization solution used for polymerization of a conductive polymer may contain a dopant. Examples of a dopant include toluene sulfonic acid iron and anthraquinone sulfonic acid. These dopants also function as an oxidizing agent and are preferable.

For the polymerization of a conductive polymer, either of a method of immersing an anode body in a solution of conductive polymer (chemical polymerization) and a method for performing polymerization by applying voltage (electrolytic polymerization), or both of the methods can be used. The method may be conducted repeatedly.

There is no particular limit on the kind of conductive polymers, concentration of the dopant, polymerization temperature and polymerization time, and these can be determined according to conventional technology. In case of polymerizing a polymer by electrolytic polymerization, energization conditions can be determined by conventional technology and preliminary experiments.

After forming the semiconductor layer, washing and heat treatment may be conducted in the same way as in the above-mentioned chemical conversion process. However, the temperature of the heat treatment is preferably a temperature lower than that in the chemical formation process, more preferably 100 to 150° C. to prevent degradation of the semiconductor layer.

<Post-Chemical Conversion Process>

After forming the semiconductor layer, a process of post-chemical conversion is conducted to repair the defects generated in the dielectric layer.

The post-chemical conversion process can be conducted in the same way as in the chemical conversion process. That is, the process can be conducted by immersing an anode body having a semiconductor layer formed thereon in a chemical conversion solution and by applying a predetermined voltage between the anode body (anode) and a counter electrode (cathode) for a predetermined time. However, it is preferable to apply a voltage lower than that in the chemical formation process to prevent degradation of a semiconductor layer.

After the post chemical conversion, washing and heat treatment may be conducted in the same way as in the above-mentioned process of forming a semiconductor layer.

A set of the above-mentioned polymerization of a conductive polymer, washing, heat treatment, post chemical conversion, washing, and heat treatment may be repeated.

<Non-Aqueous Electrolysis Process>

A non-aqueous electrolysis process is conducted after the post-chemical conversion process. Specifically, electrolysis operation is conducted by immersing an anode body in a solution of a non-aqueous solvent containing an oxidizing agent.

The electrolysis operation can be conducted by immersing an anode body after the post-chemical conversion process in a non-aqueous solvent containing an oxidizing agent and applying a predetermined voltage between the anode body (anode) and a counter electrode (cathode). The initial current value can be determined taking into consideration the size of the anode body and the average particle diameter of the tungsten powder to be used. It is preferably 0.01 to 10 mA/anode body, more preferably 0.1 to 2 mA/anode body.

Examples of a non-aqueous solvent is the one which dissolves an oxidizing agent. For example, monovalent alcohol, bivalent alcohol and trivalent alcohol are preferable. As monovalent alcohol, methyl alcohol, ethanol, and propyl alcohol are preferable. As bivalent alcohol, ethylene glycol and propylene glycol are preferable.

From the viewpoint of management of the liquid level in consideration of evaporation of the solvent, a mixed solvent of monovalent alcohol and bivalent alcohol is preferable. There is no particular limit on the blending ratio.

The non-aqueous solvent may contain a slight amount of water derived from the moisture in the air and a slight amount of water which is difficult to be dehydrated at the time of manufacturing a commercially-available solvent. The water content is preferably 10,000 ppm or less.

Examples of an oxidizing agent include those which can be dissolved in the above-mentioned non-aqueous solvent. For example, sulfonic acid, sulfonates and organic peroxides are included. Two or more of these may be used in combination. Among these, sulfonates (such as naphthalene sulfonate and anthracene sulfonate) are preferable, and naphthalene-sulfonic acid iron is particularly preferred.

The concentration of an oxidizing agent is preferably a saturation concentration or lower, more preferably 0.2 to 10 mass %, and still more preferably 0.2 to 5 mass %.

The temperature of the non-aqueous solvent during the electrolysis operation is preferably a boiling point of the non-aqueous solvent or lower, more preferably 30° C. or lower.

As to the time for the electrolysis operation, it is preferable to conduct the electrolysis until no unreacted monomers and low-polymerization oligomers which remained in the semiconductor layer remain. An end point of the electrolysis may be established at the time when the current value starts to decline or when the voltage starts to increase.

After the electrolysis operation, washing and heat treatment may be conducted in the same way as in the above-mentioned process of forming a semiconductor layer.

In the present invention, by conducting electrolysis operation using a non-aqueous solvent, unreacted monomers and low-polymerization oligomers remaining in the semiconductor layer are polymerized so as to make up the defects in the semiconductor layer generated in the post-chemical conversion process conducted just before the electrolysis, making the surface of the semiconductor layer uniformly flat. In the case of using an aqueous solvent, unreacted monomers and low-polymerization oligomers are less likely to be polymerized and equivalent effect cannot be expected. Furthermore, an oxidizing agent contained in the solution used in the electrolysis operation can lessen reduction action and solvent action due to hydrogen and water (in a state of steam at a high temperature) generated by polymerization. This can suppress the degradation of the dielectric layer.

In the present invention, the scoops generated by the detachment of the semiconductor layer during the post-chemical conversion process can be filled as described above, and unreacted monomers and low-polymerization oligomers responsible for degradation of the dielectric layer can be consumed. Accordingly, the cause of the increase in the leakage current after the heat treatment at a high temperature can be solved.

<Process for Forming a Conductor Layer>

A process of forming a conductor layer is conducted after the non-aqueous electrolysis process. Known materials and methods for forming a conductor layer which were conventionally applied to a capacitor can be used to form a conductor layer on the anode body. For example, a method of sequentially laminating a silver layer on a carbon layer may be used.

A cathode lead is electrically connected to the above-mentioned conductor layer, and a part of the cathode lead is exposed outside the outer jacket of the electrolytic capacitor to serve as a cathode external terminal. On the other hand, in an anode body, a part of the anode lead is exposed outside the outer jacket of the capacitor to serve as an anode external terminal. Subsequently, an outer jacket is formed by encapsulation with resin and the like to obtain a capacitor.

EXAMPLES

The present invention is described below in more detail by referring to Examples and Comparative Examples, but the present invention is not limited thereto.

In the present invention, the measurement of the particle diameter (volume average particle diameter and particle diameter distribution), BET specific surface area, capacitance, and LC values were carried out by the methods described below.

The particle diameter (volume average particle diameter) of powder was measured by using HRA9320-X100 manufactured by Microtrack (laser diffraction scattering-type particle size distribution analyzer). Specifically, volume basis particle diameter distribution was measured by the analyzer, and a particle size value when the accumulated volume % corresponded to 50%, 10% or 90% were designated as volume average particle size of D50 (μm), D10 (μm) and D90 (μm), respectively.

The BET specific surface area was measured by the BET method by using NOVA2000E (manufactured by SYSMEX Corporation).

The capacitance was measured by using an LCR meter manufactured by Agilent Technologies at room temperature, 120 Hz and bias voltage of 2.5 V.

The LC value was measured 30 seconds after applying a voltage of 2.5 V at room temperature.

Examples 1 to 4, Comparative Examples 1 to 2

0.6 parts by mass of silicon powder (volume average particle diameter D50 of 0.8 μm, D10 of 0.3 μm and D90 of 8 μm) was mixed with 100 parts by mass of tungsten powder (volume average particle diameter D50 of 0.4 μm, D10 of 0.05 μm and D90 of 5 μm) obtained by reducing tungsten trioxide under hydrogen atmosphere, and the mixture was left to stand under vacuum condition at 1,200° C. for 20 minutes, and cooled to room temperature. After fully conducting gradual oxidation, the powder was taken out in the air. The resultant aggregates were pulverized to obtain particles having volume average particle diameter D50 of 55 μm, D10 of 35 μm and D90 of 150 μm. Part of silicon was alloyed in a part of the surface layer of the tungsten powder.

(1) Sintering Process

After molding the above-mentioned partially silicified tungsten powder using a tantalum wire of 0.24 mmϕ for an anode lead, the molded body was sintered in vacuum at 1,300° C. for 20 minutes to produce 1,000 pieces of anode bodies having a size of 1.0×2.3×1.7 mm (32 mg; a tantalum wire was implanted on the 1.0×2.3 mm face).

(2) Chemical Conversion Process

Subsequently, a solution containing 4 mass % of potassium persulfate as an oxidizing agent was prepared in a stainless container, and an anode body and a part of the tantalum lead were immersed in the solution. The lead wire and the stainless container were connected to the positive electrode and the negative electrode of the power source, respectively, to conduct chemical conversion treatment at 5° C. for one hour. As the energization conditions, a current was supplied under a constant current condition at a current density of 2 mA/anode body in the initial stage, and under a constant voltage condition at a voltage of 10 V after voltage reached 10 V. After conducting washing with water and washing with ethanol after the completion of the chemical conversion, heat treatment was conducted at 190° C. for 15 minutes.

(3) Process for Forming a Semiconductor Layer

Next, after immersing the anode body subjected to the chemical conversion in a solution of 10 mass % ethylenedioxythiophene ethanol solution, the anode body was immersed in a solution of 7 mass % toluenesulfonic acid iron and chemical polymerization was conducted at 60° C. for 15 minutes, three times.

Subsequently, a solution of water and ethylene glycol having a mass ratio of 7 to 3, which contains ethylenedioxythiophene at a saturation concentration or more and 3 mass % of anthraquinone sulfonic acid, was separately prepared. The anode body subjected to chemical polymerization was immersed in the solution to conduct electrolytic polymerization.

At the time of polymerization, polymerization was conducted by connecting the tantalum lead wire and the stainless container to the positive electrode and the negative electrode of the power source, respectively, under constant current condition of 50 μA/anode body at 25° C. for 60 minutes while stirring the solution.

After the polymerization, operations of washing with water, washing with ethanol, and heat treatment at 105° C. for 15 minutes were conducted.

(4) Post-Chemical Conversion Process

Furthermore, post-chemical conversion was conducted by immersing the anode body and a part of the lead wire in the same solution as used in (2) chemical conversion process at 25° C. for 15 minutes. As the energization conditions, a current was supplied under a constant current condition at a current density of 0.4 mA/anode body in the initial stage, and under a constant voltage condition at a voltage of 7 V after voltage reached 7 V.

After the post-chemical conversion, operations of washing with water, washing with ethanol, and heat treatment at 105° C. for 15 minutes were conducted.

A series of the above-mentioned operations of electrolytic polymerization using ethylenedioxythiophene, washing, heat treatment, post-chemical conversion, washing and heat treatment was repeated five times. As the energization conditions for the polymerization, a current was supplied under a constant current condition at a current density of 60 μA/anode body in the third and the fourth time, and at a current density of 80 μA/anode body in the fifth time.

(5) Non-Aqueous Electrolysis Process

Next, in Examples 1 to 4, electrolysis operation was conducted by immersing an anode body in a solution of a non-aqueous solvent containing an oxidizing agent as in Table 1 at a current value and under temperature/time conditions as in Table 1. At the time of electrolysis operation, the tantalum lead wire and the stainless container were connected to a positive electrode and a negative electrode of a power source, respectively. After the operation, washing with ethanol and heat treatment at 105° C. for 15 minutes were conducted.

In Comparative Example 1, this process was skipped and the next (6) process for forming a conductive polymer was conducted.

In Comparative Example 2, the electrolysis operation, washing and heat treatment were conducted in the same way as in Example 1 except that the solution used in the electrolysis operation was changed to a solution of 1 mass % toluenesulfonic acid iron.

TABLE 1

| | Non-aqueous solvent | Oxidizing agent | | Current value (constant current condition) | | |
|---|---|---|---|---|---|---|
| | | Kind | Concentration (mass %) | mA/anode body | Temperature ° C. | Time minutes |
| Example 1 | Ethylene glycol | Naphthalene-sulfonic acid iron | 1 | 0.1 | 5 | 30 |

TABLE 1-continued

| | Non-aqueous solvent | Oxidizing agent Kind | Concentration (mass %) | Current value (constant current condition) mA/anode body | Temperature ° C. | Time minutes |
|---|---|---|---|---|---|---|
| Example 2 | Propylene glycol:ethanol (ratio by mass) = 8:2 | Naphthalene-sulfonic acid iron | 3 | 1.5 | 25 | 15 |
| Example 3 | Propylene glycol:ethanol (ratio by mass) = 8:2 | Naphthalene-sulfonic acid iron | 3 | 0.2 | 0 | 45 |
| | | Peracetic acid | 1 | 0.2 | | |
| Example 4 | Ethanol | Peracetic acid | 1 | 0.5 | 0 | 60 |

(6) Process for Forming a Conductor Layer

Next, a carbon layer and a silver layer were sequentially laminated on the faces of the anode body except the face where a lead wire is implanted, and each of the layers was dry-cured at 105° C. for 20 minutes to produce 32 pieces of tungsten capacitor elements per example. With respect to the capacitance and LC values, the averages of initial values and the values after the heat treatment at a high-temperature are shown in Table 2. In the heat treatment at a high temperature, capacitor elements were heated at 160° C. for 10 minutes in the air. The values indicated as "After the heat treatment at a high temperature" were measured after the heat treatment at a high temperature and cooling the capacitor elements to room temperature.

TABLE 2

| | Initial values | | Values after heat treatment at a high temperature | |
|---|---|---|---|---|
| | Capacitance μF | LC μA | Capacitance μF | LC μA |
| Example 1 | 239 | 40 | 227 | 52 |
| Example 2 | 245 | 37 | 231 | 48 |
| Example 3 | 230 | 47 | 242 | 57 |
| Example 4 | 228 | 50 | 246 | 60 |
| Comparative example 1 | 226 | 48 | 263 | 506 |
| Comparative Example 2 | 215 | 55 | 259 | 647 |

With respect to the anode bodies of Example 1 (randomly selected five pieces), the change in mass, the change in the thickness of semiconductor layer on one surface of the 2.3 mm×1.7 mm face of the anode body, and change in the sulfur content were measured before and after the non-aqueous electrolysis process. The average values of the five pieces were +0.8 mg in the mass change and +0.4 μm in the change of the thickness of the semiconductor layer. The average sulfur content values were 0.34 mass % and 0.42 mass % of the whole anode body before and after the non-aqueous electrolysis operation, respectively. The sulfur is derived from a dopant and a conductive polymer.

Examples 5 to 6, Comparative Example 3

After mixing an aqueous solution of 1 mass % boric acid in a tungsten powder in an amount of 10 mass % of the powder, the resultant powder was heated under vacuum at 100° C. for 60 minutes, and water was removed to obtain a partially-boronized tungsten powder.

(1) Sintering Process

The process was conducted in the same way as in Example 1 except that the partially-silicified tungsten powder was changed to the partially-boronized tungsten powder.

(2) Chemical Conversion Process

The process was conducted in the same way as in Example 1 except that the oxidizing agent in the chemical conversion solution was changed to 3 mass % of ammonium persulfate, the temperature and time for chemical conversion were set to 50° C. and five hours, respectively, and the voltage under a constant voltage condition was set to 12 V.

(3) Process for Forming a Semiconductor Layer

The process was conducted in the same way as in Example 1 except that an ethanol solution of pyrrol and an ethanol solution of naphthalenesulfonic acid iron were used instead of an ethanol solution of ethylenedioxythiophene and an ethanol solution of toluenesulfonic acid iron in the operation of immersing an anode body before the electrolytic polymerization.

The electrolytic polymerization was conducted in the same way as in Example 1 except that a mixture containing pyrrole and ethylenedioxythiophene at a ratio of 3 to 7 by mass was used instead of ethylenedioxythiophene.

(4) Post-Chemical Conversion Process

The process was conducted in the same way as in Example 1 except that the oxidizing agent in the chemical conversion solution was changed to 3 mass % of ammonium persulfate.

(5) Non-Aqueous Electrolysis Process

Next, in Examples 5 and 6, after conducting electrolysis operation by immersing an anode body in a solution of a non-aqueous solvent containing an oxidizing agent as in Table 3 at a current value and under temperature/time conditions as in Table 3, washing and heat treatment were conducted in the same way as in Example 1.

In Comparative Example 3, this process was skipped and the next (6) process for forming a conductive polymer was conducted.

TABLE 3

| | Non-aqueous solvent | Oxidizing agent kind | Concentration (mass %) | Current value (constant current condition) mA/anode body | Temperature °C. | Time minutes |
|---|---|---|---|---|---|---|
| Example 5 | Ethylene glycol | Naphthalene-sulfonic acid iron | 2 | 0.5 | 10 | 30 |
| Example 6 | Propylene glycol:ethanol (ratio by mass) = 8:2 | Naphthalene-sulfonic acid iron | 4 | 1 | 25 | 60 |

(6) Process for Forming a Conductor Layer

The process was conducted in Examples 5 to 6 and Comparative Example 2 in the same way as in Example 1.

With respect to the capacitance and LC values, the averages of initial values and the values after the heat treatment at a high-temperature were measured in each of the examples in the same way as in Example 1. The results are shown in Table 4.

TABLE 4

| | Initial values | | Values after heat treatment at a high temperature | |
|---|---|---|---|---|
| | Capacitance µF | LC µA | Capacitance µF | LC µA |
| Example 1 | 190 | 34 | 185 | 42 |
| Example 2 | 195 | 37 | 191 | 48 |
| Comparative example 3 | 183 | 45 | 202 | 735 |

As described above, the capacitor elements have a smaller LC value after the high-temperature heat treatment in Examples 1 to 6 in which the non-aqueous electrolysis process was conducted by immersing the anode body subjected to the post-chemical conversion process in a solution of a non-aqueous solvent containing an oxidizing agent, compared to Comparative Examples 1 and 3 in which the non-aqueous electrolysis was not conducted. This indicates that a capacitor element having good LC characteristics even after the high-temperature heat treatment can be obtained by conducting a non-aqueous electrolysis operation. Also, it was confirmed that the effect cannot be achieved in Comparative Example 2 in which an aqueous solvent is used in the electrolysis operation.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application claims priority from Japanese Patent Application No. 2014-128078 filed Jun. 23, 2014, incorporated herein by reference in its entirety.

The invention claimed is:

1. A method for producing a capacitor element, comprising:
a sintering process to form an anode body by sintering tungsten powder or a molded body thereof,
a chemical formation process to form a dielectric layer on the surface layer of the anode body,
a process of forming a semiconductor layer to form a semiconductor layer on the dielectric layer,
a post-chemical formation process to repair defects generated on the dielectric layer,
a non-aqueous electrolysis process to conduct an electrolysis operation by immersing the anode body in a non-aqueous solvent containing an oxidizing agent, and
a process of forming a conductor layer to form a conductor layer on the anode body,
in this order.

2. The method for producing a capacitor element as claimed in claim 1, wherein the oxidizing agent in the non-aqueous electrolysis process is at least one member selected from a group consisting of sulfonic acid, salt of sulfonic acid and organic peroxide.

3. The method for producing a capacitor element as claimed in claim 1, wherein the oxidizing agent in the non-aqueous electrolysis process is naphthalenesulfonic acid or naphthalene sulfonate.

4. The method for producing a capacitor element as claimed in claim 1, wherein the non-aqueous solvent in the non-aqueous electrolysis process is at least one member selected from a group consisting of methyl alcohol, ethanol, propyl alcohol, ethylene glycol and propylene glycol.

5. The method for producing a capacitor element as claimed in claim 4, wherein the non-aqueous solvent in the non-aqueous electrolysis process is a mixed solvent of monovalent alcohol selected from a group consisting of methyl alcohol, ethanol, and propyl alcohol, and bivalent alcohol selected from a group consisting of ethylene glycol and propylene glycol.

* * * * *